(12) United States Patent
Osterwise

(10) Patent No.: US 10,057,872 B2
(45) Date of Patent: *Aug. 21, 2018

(54) METHOD AND APPARATUS FOR MANAGING COMMUNICATION SERVICES USING MULTIPLE SUBSCRIPTION AGREEMENTS

(71) Applicant: AT&T MOBILITY II LLC, Atlanta, GA (US)

(72) Inventor: Robert Osterwise, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,610

(22) Filed: Feb. 9, 2017

(65) Prior Publication Data

US 2017/0215163 A1      Jul. 27, 2017

Related U.S. Application Data

(63) Continuation of application No. 14/866,033, filed on Sep. 25, 2015, now Pat. No. 9,609,613.

(51) Int. Cl.
*H04W 4/00* (2018.01)
*H04W 60/04* (2009.01)
(Continued)

(52) U.S. Cl.
CPC .......... *H04W 60/04* (2013.01); *H04W 4/021* (2013.01); *H04W 8/183* (2013.01); *H04W 48/18* (2013.01); *H04W 4/02* (2013.01)

(58) Field of Classification Search
CPC ....... H04W 60/04; H04W 4/02; H04W 4/021; H04W 8/183; H04W 48/18
(Continued)

(56) References Cited

U.S. PATENT DOCUMENTS 7,127,245 B2   10/2006 Almgren
7,280,505 B2   10/2007 Chaskar et al.
(Continued)

FOREIGN PATENT DOCUMENTS

WO         0223309 A2    3/2002
WO      2011116248 A1    9/2011
(Continued)

OTHER PUBLICATIONS

Aziz, Eng Wagdy Anis, "Design and Analysis of IP Multimedia Subsystem (IMS)", Diss. Ain Shams University, 2011.
(Continued)

*Primary Examiner* — Mong-Thuy Tran
(74) *Attorney, Agent, or Firm* — Guntin & Gust, PLC; Robert Gingher

(57) ABSTRACT

Aspects of the subject disclosure may include, for example, storing subscription utilization information in the memory where the subscription utilization information is indicative of a history of subscription usage by the device and where registration information associated with a group of subscription agreements is stored in the memory, receiving location information from the device processor where the location information indicates a location of the device, and selecting a target subscription agreement from among the group of subscription agreements according to the history of subscription usage and the location information. Other embodiments are disclosed.

20 Claims, 13 Drawing Sheets

(51) Int. Cl.
*H04W 8/18* (2009.01)
*H04W 48/18* (2009.01)
*H04W 4/021* (2018.01)
*H04W 4/02* (2018.01)

(58) Field of Classification Search
USPC .................................. 455/435.3, 435.1, 558
See application file for complete search history.

(56) References Cited

U.S. PATENT DOCUMENTS

| | | | |
|---|---|---|---|
| 7,570,944 | B2 | 8/2009 | Dunlop et al. |
| 7,812,766 | B2 | 10/2010 | Karr et al. |
| 7,986,935 | B1 | 7/2011 | D'Souza et al. |
| 8,204,968 | B2 | 6/2012 | Lewis et al. |
| 8,229,468 | B1 | 7/2012 | Robinson et al. |
| 8,437,271 | B2 * | 5/2013 | Raleigh ............ G06Q 10/06375 370/252 |
| 8,615,236 | B2 | 12/2013 | Kashikar et al. |
| 8,620,314 | B2 | 12/2013 | Yip et al. |
| 8,644,833 | B1 | 2/2014 | Manning et al. |
| 8,731,551 | B2 | 5/2014 | Horn et al. |
| 8,996,002 | B2 | 3/2015 | Rodgers |
| 9,036,554 | B2 | 5/2015 | Merino |
| 9,313,643 | B1 | 4/2016 | Ghoshal et al. |
| 2002/0065721 | A1 | 5/2002 | Lema et al. |
| 2005/0059385 | A1 | 3/2005 | Twigg et al. |
| 2009/0054061 | A1 | 2/2009 | Dawson et al. |
| 2010/0099393 | A1 | 4/2010 | Brisebois et al. |
| 2010/0182985 | A1 | 7/2010 | Guenther et al. |
| 2010/0291927 | A1 | 11/2010 | Wu et al. |
| 2010/0311418 | A1 | 12/2010 | Shi et al. |
| 2010/0311444 | A1 * | 12/2010 | Shi .................. H04W 48/18 455/466 |
| 2011/0130117 | A1 | 6/2011 | Fan et al. |
| 2013/0023235 | A1 | 1/2013 | Fan et al. |
| 2013/0132854 | A1 | 5/2013 | Raleigh et al. |
| 2013/0304581 | A1 | 11/2013 | Soroca et al. |
| 2013/0325667 | A1 | 12/2013 | Satyavolu et al. |
| 2013/0337803 | A1 | 12/2013 | Christopher et al. |
| 2014/0073375 | A1 | 3/2014 | Li et al. |
| 2014/0088731 | A1 | 3/2014 | Von et al. |
| 2014/0099916 | A1 | 4/2014 | Mallikarjunan et al. |
| 2014/0199989 | A1 | 7/2014 | Cepuran et al. |
| 2014/0342715 | A1 | 11/2014 | Gu et al. |
| 2015/0017962 | A1 | 1/2015 | Howard et al. |
| 2015/0057044 | A1 * | 2/2015 | Altman ................. H04W 4/003 455/558 |
| 2015/0189491 | A1 | 7/2015 | Barclay |
| 2015/0289129 | A1 | 10/2015 | Li et al. |
| 2015/0296369 | A1 * | 10/2015 | Berionne .............. H04W 8/183 455/418 |
| 2015/0358757 | A1 * | 12/2015 | Ford .................... H04W 4/001 455/418 |
| 2016/0057661 | A1 | 2/2016 | Nayak et al. |
| 2016/0192312 | A1 | 6/2016 | Lambert et al. |
| 2017/0094629 | A1 | 3/2017 | Osterwise |

FOREIGN PATENT DOCUMENTS

| | | |
|---|---|---|
| WO | 2013066364 A2 | 5/2013 |
| WO | 2013170208 A1 | 11/2013 |
| WO | 2015061782 | 4/2015 |
| WO | 2015088411 A1 | 6/2015 |

OTHER PUBLICATIONS

Islam, Shariful et al., "Converged access of IMS and web services: A virtual client model", Network, IEEE 27.1 (2013): 3744.

Mani, Mehdi et al., "How IMS enables converged services for cable and 3G technologies: a survey", EURASIP Journal on Wireless Communications and Networking 2008 (2008): 20.

Van Der Laak Sknfnd, Frode et al., "nSHIELD new embedded Systems archItecturE for multi-Layer Dependable solutions", D7.12 Social Mobility and Networking demonstrator Validation and Verification Report, Project No. 269317, Jan. 9, 2011.

Zafeiris, Vassilis E. et al., "An agent-based perspective to handover management in 4G networks", Wireless Communications and Mobile Computing 8.7 (2008): 927939.

* cited by examiner

100

800

METHOD AND APPARATUS FOR MANAGING COMMUNICATION SERVICES USING MULTIPLE SUBSCRIPTION AGREEMENTS

CROSS-REFERENCE TO RELATED APPLICATIONS

This application is a continuation of U.S. patent application Ser. No. 14/866,033, filed Sep. 25, 2015, the disclosure of which is hereby incorporated by reference in its entirety.

FIELD OF THE DISCLOSURE

The subject disclosure relates to a method and apparatus for managing communication services using multiple subscription agreements.

BACKGROUND

Communication devices utilize subscription agreements with service providers that control or otherwise dictate aspects of communication services that the devices can provide. Subscription agreements can change over time as technology changes and business strategies evolve. Some communication devices remain in service for long periods of time over which there may be updates to the subscription agreements.

BRIEF DESCRIPTION OF THE DRAWINGS

Reference will now be made to the accompanying drawings, which are not necessarily drawn to scale, and wherein.

DETAILED DESCRIPTION

Figure 1:
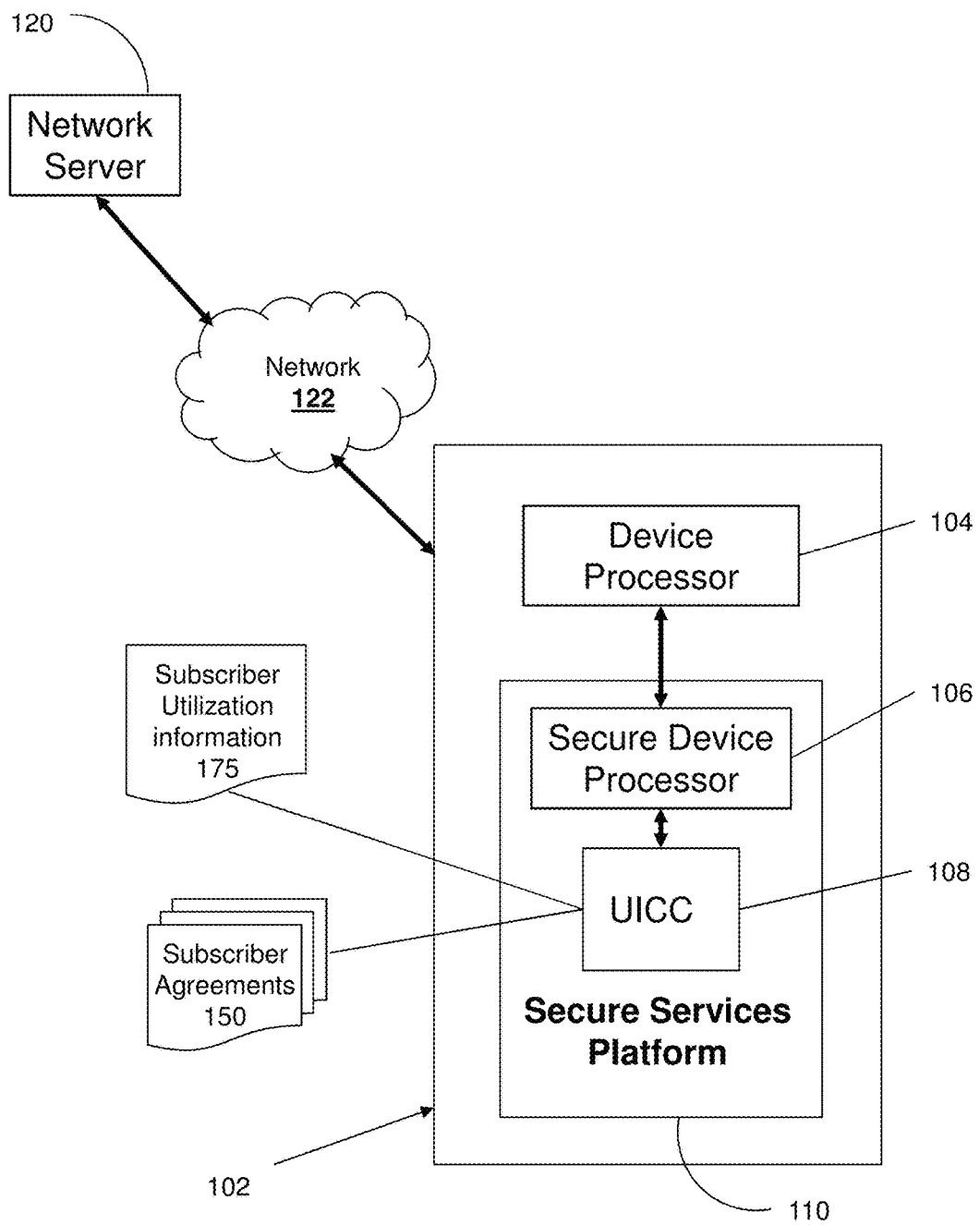
FIG. 1 depicts an illustrative embodiment of a system that enables use of a UICC and a secure device processor as part of a secure services platform for selecting among multiple subscription agreements.

The subject disclosure describes, among other things, illustrative embodiments for a communication device to select among different subscription agreements, such as associated with the same and/or different service providers. In one or more embodiments, local subscription steering is performed for multiple loaded subscription profiles, such as stored by a Universal Integrated Circuit Card (which may be an embedded UICC or a removable UICC) of a wireless communication device. The communication device can be various types of devices, such as a vehicle communication system, a cargo container, a smart-appliance, a mobile phone, and so forth. The UICC can apply a selection policy (e.g., stored rules or criteria) to determine which subscription agreement is best or better suited for the particular circumstances. The selection can be based on various factors including device location, cost, service type, government regulations, provider partnership agreements, network conditions, history of subscription utilization, and so forth.

In one or more embodiments, an intelligent client can be implemented on a UICC that can administer and activate multiple subscriptions loaded onto a UICC (or Subscriber Identity Module (SIM) card), such as a single UICC, to prevent orphaning of a subscriber in the event of a subscription life cycle change. The intelligent client can also enable configurations to support switching to a specific subscription on a UICC using localized service offerings in a market where a particular service provider requires or desires a provider partner to satisfy regulatory requirements or business agreements.

In one or more embodiments, a history of subscription usage can be monitored (e.g., by a UICC processor) and can be utilized in selecting the subscription agreement. In one or more embodiments, the UICC can have a UICC processor which is distinct from a device processor of the communication device. The UICC processor can perform various functions including the subscription agreement selection. In one or more embodiments, a bootstrap subscription service can be implemented (e.g., by the UICC processor) which provides a minimum or reduced amount of service (e.g., no user-based services) to a particular device so that the UICC processor can communicate with the network for accessing and registering according to the most appropriate or otherwise selected subscription agreement for the particular circumstances. One or more of the exemplary embodiments can determine a level of service (e.g., normal service, limited service such as emergency calls only, or no service) and can implement the registration process accordingly. Other embodiments are described in the subject disclosure.

One or more aspects of the subject disclosure include a device having a device processor that provides communication services and a UICC. The UICC includes a UICC processor and a memory that stores executable instructions that, when executed by the UICC processor, facilitate performance of operations, including storing subscription utilization information in the memory, where the subscription utilization information is indicative of a history of subscription usage by the device, and where registration information associated with a group of subscription agreements is stored in the memory. The UICC processor receives location information from the device processor, where the location information indicates a location of the device. The UICC processor selects a target subscription agreement from among the group of subscription agreements according to the history of subscription usage and the location information. The UICC processor initiates a registration with a network server according to target registration information of the registration information corresponding to the target subscription agreement.

One or more aspects of the subject disclosure include a machine-readable storage medium, including executable instructions that, when executed by a UICC processor of a UICC of a communication device, facilitate performance of operations, including monitoring usage by the communication device of a group of subscription agreements to generate subscription utilization information. The UICC processor can select a target subscription agreement from among the group of subscription agreements according to the subscription utilization information and location information indicating a location of the communication device, where the selecting of the target subscription agreement comprises applying a selection policy stored at the communication device, and where a device processor of the communication device does not have access to the selection policy. The UICC processor can transmit a registration request to a network server according to target registration information stored at the communication device corresponding to the target subscription agreement.

One or more aspects of the subject disclosure include a method in which a UICC processor of a UICC of a communication device obtains subscription utilization information and location information, where the subscription utilization information indicates usage by the communication device of a group of subscription agreements, and where the location information indicates a location of the communication device. The method can include selecting, by the UICC processor, a target subscription agreement from among the group of subscription agreements according to the subscription utilization information and the location of the communication device, where the selecting of the target subscription agreement comprises applying selection criteria stored at the communication device, and where a device processor of the communication device does not have access to the selection criteria. The method includes transmitting, by the communication device, a registration request to a network server according to target registration information stored at the communication device corresponding to the target subscription agreement.

In accordance with an embodiment of the disclosure, FIG. 1 depicts a system 100 that includes a communication device 102 connected to or otherwise in communication with a network server 120 of a network 122. The communication device has a secure services platform 110 enabling management of multiple subscription agreements associated with the communication device. Device 102 can be loaded with an administrative agent function (e.g., loaded into a secure device processor 106) to enable or otherwise facilitate identifying and selecting subscription agreements and registering with the network 122 to obtain services associated with the selected subscription agreement.

It will be appreciated that the communication device 102 may be any device, including an M2M device, a smart appliance, a vehicle communication system, a cargo container communication device, other user devices and so forth, (e.g., devices having a secure element and a secure device processor). The term "user," in this example, refers to a human user of the communication device. However, in other embodiments, the user can be a machine that exchanges data with other machines. Communication device 102 can include a device processor 104, the secure device processor 106 and the secure element 108 (e.g., which can include or be a UICC). The secure element 108 can be various types of smart cards including a Subscriber Identification Module (SIM) card or other types of secure element. The secure element 108 can be a secure computing platform and can offer a high level of security for storing encryption keys, authentication credentials, and the like. The secure element 108 may be removable from the device. In other embodiments, the secure element 108 may be embedded in the device and not removable. In other embodiments, the secure element 108 can be placed on a memory card or an embedded chip.

In one or more embodiments, the secure device processor 106 can be logically and/or physically separate from the device processor 104, and can be connected to both the device processor and the secure element 108. In this embodiment, the secure device processor 106 can offer a higher level of security than the device processor 104, and can store and execute secure applications. The secure device processor 106 can, for example, run applications in a trusted execution environment. The secure element 108 and secure device processor 106 together can form a secure services platform 110 resident on the device 102. In this embodiment, secure element 108, secure device processor 106 and device processor 104 can each have a security level associated therewith, and the security level associated with the secure device processor 106 can be intermediate between that of the secure element 108 and that of the device processor 104. In one or more embodiments, the secure element 108 and secure device processor 106 can utilize mutual authentication such as described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference. In one or more embodiments the secure device processor (or UICC processor) 106 can be resident on the UICC 108 or can be a separate circuit from the UICC.

In one or more embodiments, device 102 can be a wireless communication device capable of cellular communications. Various types of communications can also be implemented by the device 102, such as WiFi communications, Bluetooth, infrared communications (IRDa) and/or near field communications (NFC).

System 100 enables components of the secure services platform 110 (e.g., an administrative agent function of the secure device processor 106 (or UICC device processor) to store data associated with multiple subscriber agreements 150 that can be (or once were) utilized by the device 102. For example, registration information associated with a group of subscription agreements 150 can be stored in a memory of the UICC 108 or a memory of the device 102. The registration information can include various identification information and other data that can be exchanged or otherwise utilized during a registration procedure with a network server for providing services according to a particular subscriber agreement.

System 100 enables the secure device processor 106 to perform operations including storing and/or accessing subscription utilization information 175, such as from a memory of the UICC 108 or from another memory of the device 102. As an example, the subscription utilization information 175 can be indicative of a history of subscription usage by the device 102. For instance, the device 102 can monitor services being implemented at the device 102 and determine particular subscriber agreements (and/or the service provider(s) associated with the particular subscriber agreement(s)) being invoked for the services. Other information can also be collected during the monitoring, such as a particular location where the services were provided, when the services were provided, the type of services, the quality of the services, network conditions at the time of the services, the cost of the services, the availability of services from another service provider at the time of the services, and so forth. In one embodiment, the secure device processor 106 can be provisioned with the subscriber utilization information, such as via an OTA message or where the device 102 receives an updated UICC 108 and the monitored history of subscription usage by the device 102 is transferred from the old UICC to the new UICC.

In one or more embodiments, the secure device processor 106 can obtain location information that indicates a location of the device. In one or more embodiments, the secure device processor 106 can select a target subscription agreement from among the group of subscription agreements 150 according to the history of subscription usage and the location information. In one or more embodiments, the secure device processor 106 can transmit a registration request or otherwise initiate a registration with the network server 120 according to target registration information of the registration information (e.g., stored in the UICC memory) corresponding to the selected target subscription agreement.

In one or more embodiments, some of the group of subscription agreements 150 can be with different service providers while other subscription agreements are with the same service provider (e.g., multiple subscription agreements with the same service provider but having different types or levels of service). In one or more embodiments, the secure device processor 106 can provide a location request to the device processor 104, where the location information is received by the secure device processor 106 from the device processor in response to the location request.

In one or more embodiments, the secure device processor 106 can determine whether normal service (e.g., full service pursuant to a particular subscriber agreement such as voice, video, data and messaging services) is available at the location, where the initiating of the registration is responsive to a determination that the normal service is available. In one or more embodiments, the secure device processor 106 can determine that limited service is available at the location, where the limited service is based on the network server 120 recognizing a second subscription agreement of the group of subscription agreements and denying service for that second subscription agreement, and where the target subscription agreement is different from the second subscription agreement.

In one or more embodiments, the selecting of the target subscription agreement can be based on determining from the subscription utilization information 175 that the target subscription agreement is a most recently utilized subscription agreement for services at the location. In one or more embodiments, the secure device processor 106 can select the target subscription agreement based on a selection policy stored in the memory (e.g., the UICC memory), where the device processor 104 does not have access to the selection policy and/or does not have access to the UICC memory.

In one or more embodiments, the selection policy can include selection criteria such as one or more of a cost to the user, a cost to the service provider, one or more government regulations applicable to services at the location (e.g., no roaming in a particular geographic area), and so forth. In one or more embodiments, the selecting of the target subscription agreement can be based on prioritizing the selection criteria. For example, government regulations can be given the highest priority followed by a cost to a user then network traffic and so forth.

In one or more embodiments, the secure device processor 106 can determine that the network server 20 recognizes a second subscription agreement of the group of subscription agreements 150 but is denying service for that second subscription agreement (e.g., lack of payment, incompatibility, and so forth) where the target subscription agreement is different from the second subscription agreement. In this example, the selecting of the target subscription agreement can be based on determining from the subscription utilization information 175 that the target subscription agreement was the last or most recently utilized subscription agreement for services at the location.

In one embodiment, the secure device processor 106 can iterate through the history of utilized subscriber agreements to attempt to access services, such as starting with the most recently utilized subscriber agreement at a location and then continuing back through the next most recently utilized subscriber agreement until a network registration is achieved.

Figure 2:
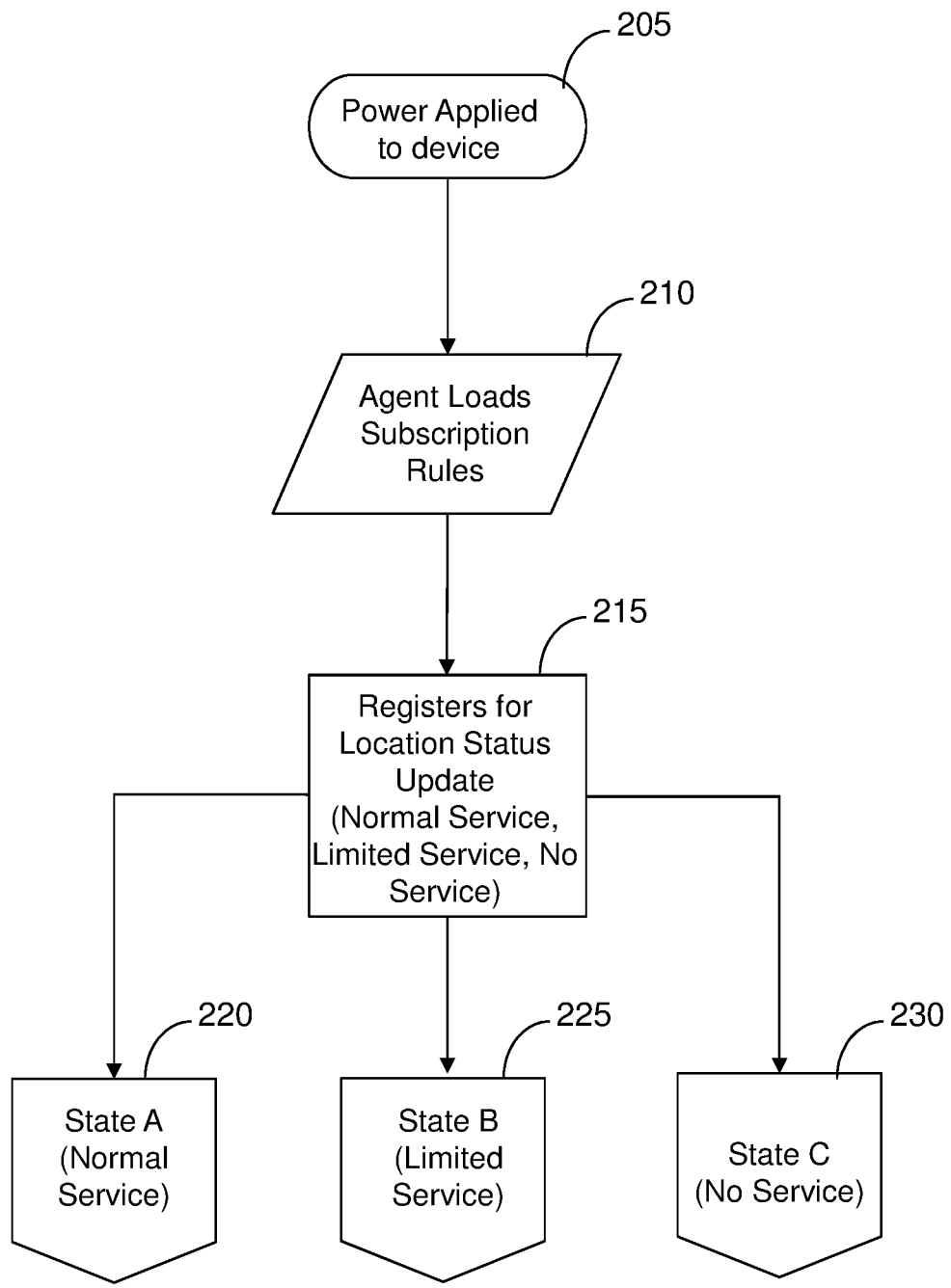
FIGS. 2-10 depict illustrative embodiments of methods used in portions of the system described in FIG. 1 to enable providing services via multiple subscription agreements.

FIG. 2 depicts an illustrative embodiment of a method 200 used by device 102 for enabling communication services. At 205 power can be applied to the device and at 210 a subscription agent, such as being executed by the UICC processor 106, can load or otherwise obtain subscription rules.

In one embodiment, the subscription rules can be a subscription selection policy and/or selection criteria that is stored by a memory of the UICC 108 and which is not accessible by the device processor 104. For example, the selection criteria can include a user cost, a service provider cost, a government regulation, and so forth. The criteria can be weighted or otherwise prioritized. In one embodiment, the subscription selection policy can take into account other factors, such as the type of services being sought, the type of communication device, the capabilities of the communication device, network conditions, and so forth.

At 215, location information indicating the present location of the communication device 102 can be obtained by the UICC processor 106, such as from the device processor 104. In one embodiment, network codes can be provided by the device processor 104 to the UICC processor 106. In another embodiment, the device processor 104 can provide device status information to the UICC processor, such as whether the device 102 is currently active, such as engaged in a communication session or otherwise communicating with a network. In one embodiment, the UICC processor can determine the present state of services for the location, such as a normal service state 220 (e.g., user services including voice, video, date and/or messaging available), a limited service state 225 (e.g., emergency calls only, or the network recognizes a particular subscription agreement of the device 102 but denies services) or a no service state 230.

Figure 3:
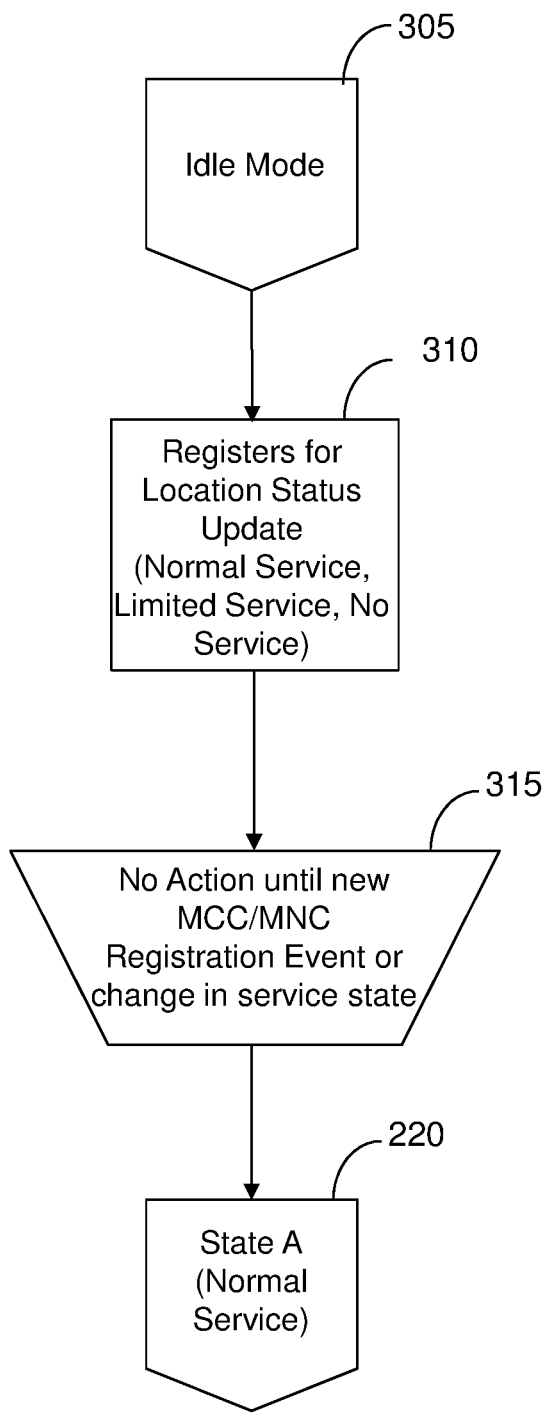

Referring to method 300 of FIG. 3, the device 102 may also be in an idle mode at 305 and at 310 can obtain the location information and/or other information enabling a determination of the state of service. In one embodiment at 315, the UICC processor 106 can delay or otherwise take no action with respect to registering for services until detecting a change in the state of service and/or a new MCC/MNC registration event. Device 102 can then enter or remain in the normal service state. In one embodiment, method 300 can be applicable when the device 102 is already registered on a particular network via a particular subscription agreement.

Figure 4:
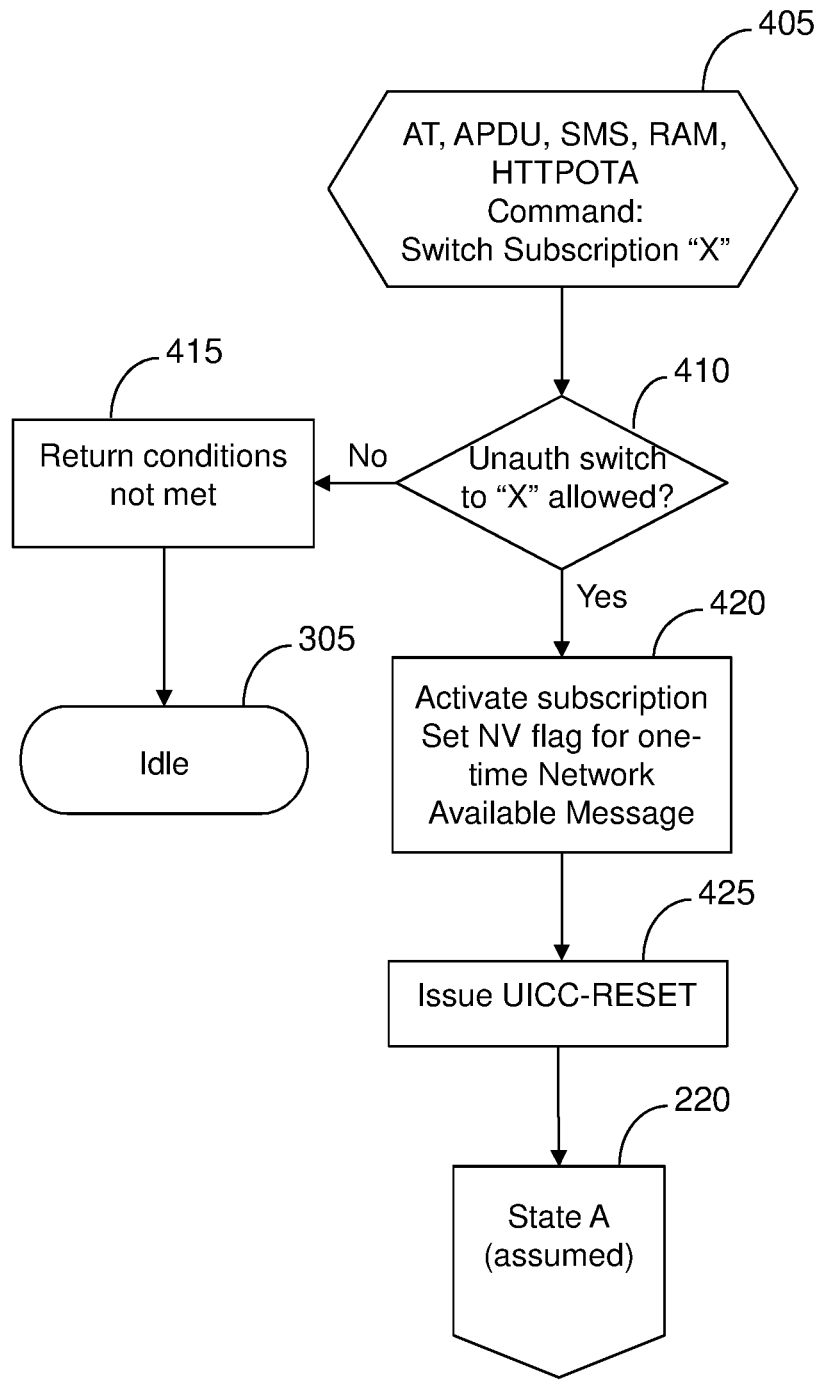

Referring to method 400 of FIG. 4, the device 102 may receive a command or request for subscription selection or subscription change. For example at 405, a request can be received by the device 102 via various communication techniques such as an SMS message, an application protocol data unit command, an AT command, an Over-the-Air command (e.g., an HTTPOTA), a RAM command and so forth. For instance, a vehicle communication system can receive a subscription change command at a dealership when a communication server at the dealership is plugged into a port of the vehicle communication system.

At 410, the command can be evaluated to determine if it is authorized or otherwise permitted. For instance, if the change in subscription agreement is not permitted and return conditions are not met at 415 (e.g., the UICC processor 106 and/or the device processor 104 may not desire to change a current subscription agreement being utilized for services) then the device 102 can return to idle mode 305. If on the other hand the change in subscription agreement is permitted then at 420 the UICC processor 106 can activate the particular requested subscription (e.g., the UICC processor can instruct the device processor 104 to send out registration information to a network server). A UICC reset can be performed (e.g., the UICC processor 106 can inform the device processor 104 of the change in subscription parameters) at 425 to facilitate establishing the registration and the services via the requested subscription agreement. Method 400 can then enter the normal service state 220 for the particular request subscription agreement.

Figure 5:
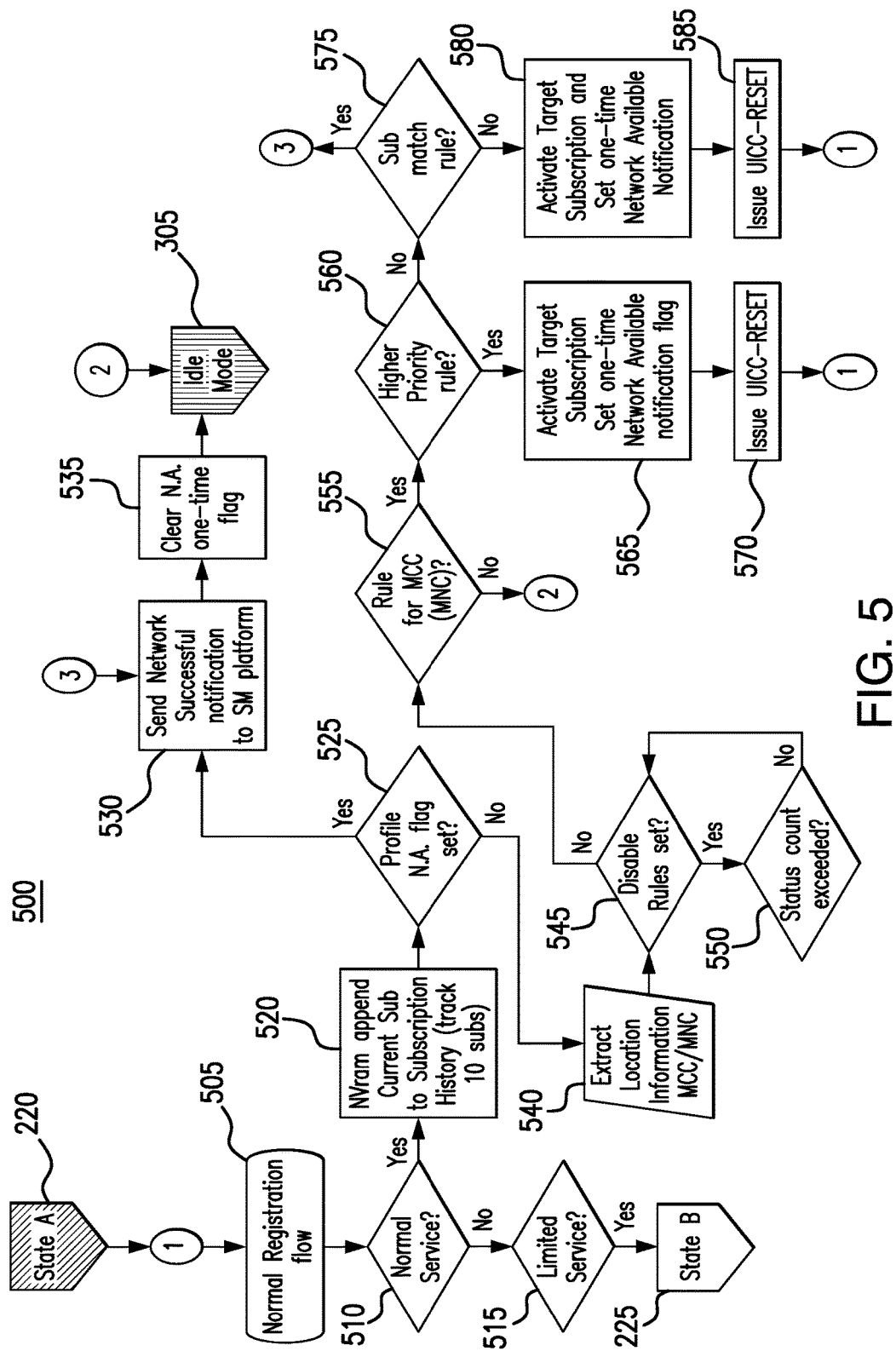

Referring to method 500 of FIG. 5, the device 102 previously determined to be in a normal service state 220 can at 505 perform a normal registration flow that includes at 510 confirming normal service state exists. If a normal service state 220 does not in fact exist the device 102 can determine at 515 whether a limited service state 225 exists. If on the other hand it is determined that the normal service state 220 does exist then at 520 monitoring of the utilization of subscription agreements is performed or otherwise continued (e.g., adjusting history data to indicate that the current subscription agreement is associated with the current location). At 525 a determination can be made as to whether service is available via a network associated with the currently selected subscription agreement. If the network service is available then at 530 and 535, the UICC processor 106 can notify the SM platform and return to the idle mode 305.

Otherwise, at 540 the UICC processor 106 can obtain location information at 540 and then at 545 determine whether the subscription selection process may be implemented. For instance, a delay may be triggered at 550 according to the number of times the selection process has been attempted to avoid excessive cycling of the process.

If on the other hand the selection process is available to be utilized by the UICC processor 106 then at 555 the UICC processor can determine whether the selection policy has a particular rule(s) applicable for the location, such as selection criteria applicable to a Mobile Country Code (MCC) or a Mobile Network Code (MNC) or a particular subscription agreement that is to be utilized with this MCC/MNC. If there is no applicable rule(s) then method 500 can return to the idle mode 305. Otherwise, at 560 the UICC processor 106 can determine whether there are other higher priority rule(s) or other higher priority criteria that are to be considered. At 565 and 570, the higher priority rule(s) can be applied to select a different subscription agreement from among a group of available subscription agreements and the registration process according to the selected subscription agreement can be performed. For instance, the UICC processor 106 may determine that this MNC typically utilizes subscription agreement A, however, due to a higher priority rule pertaining to a partnership agreement that has gone into effect, subscription agreement B should be utilized. If there is no higher priority rule and the MCC/MNC has a particular rule then at 575 a determination can be made as to whether the present subscription agreement being utilized satisfies the particular rule(s) for the current location in which case the SM platform can be notified or whether a new subscription agreement is to be selected and a registration performed as in 580 and 585.

Figure 6:
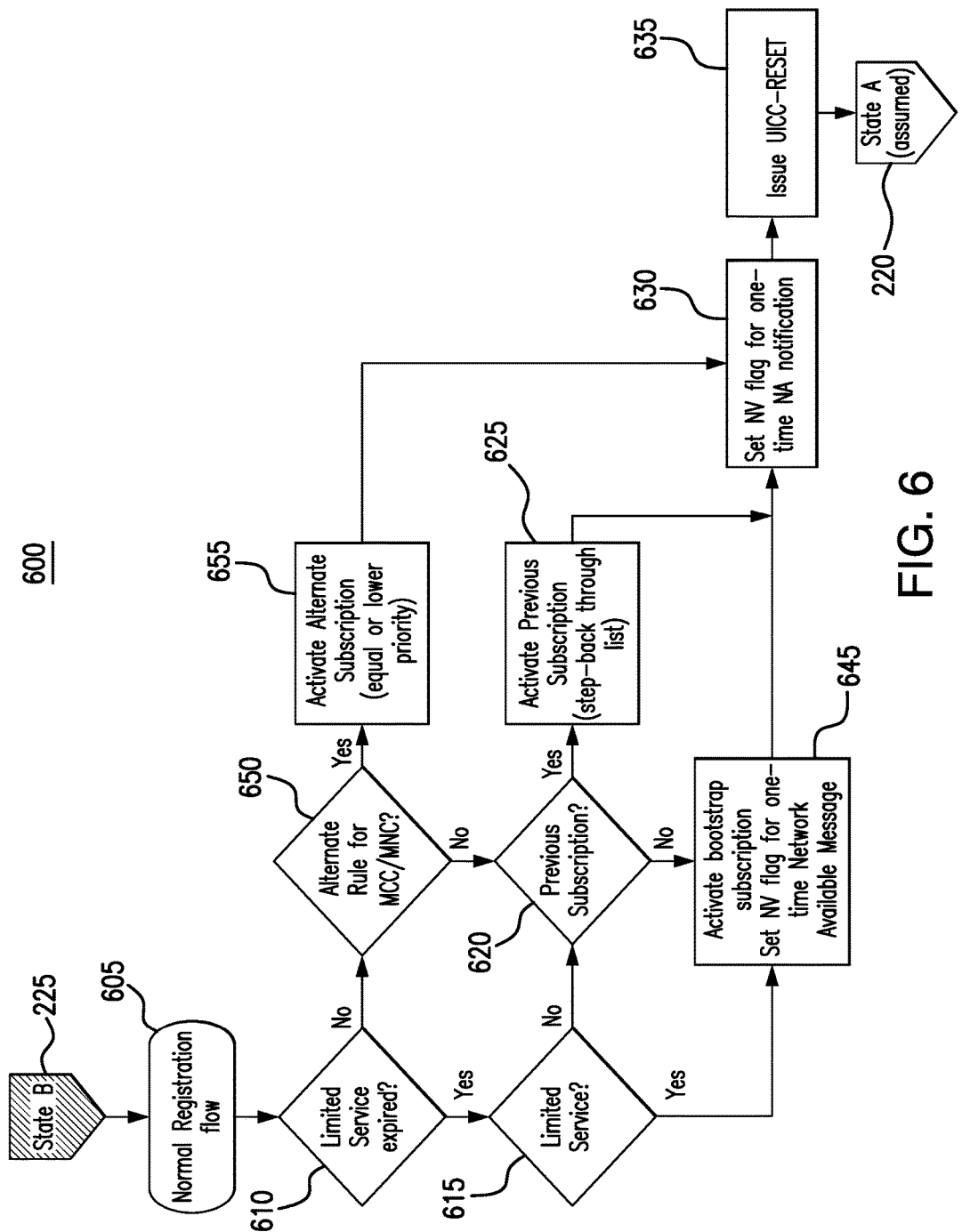

Referring to method 600 of FIG. 6, the device 102 previously determined to be in a limited service state 225 can at 605 perform a normal registration flow that includes confirming at 610 whether a time period associated the limited service state 225 has expired. If the time period has expired then at 615 the UICC processor 106 can determine whether the limited service still exists. If the limited service does not exist then at 620 the UICC processor 106 can determine if there was a previous subscription agreement utilized (e.g., a most recently utilized subscription agreement such as for the current location). If there was one or more previous subscription agreements utilized then at 625 the UICC processor 106 can go through each such subscription agreement (e.g., starting from the most recently utilized) until a successful registration occurs via 630 and 635 and the device 102 is returned to a normal service state 220. In the event that the UICC processor 106 cannot determine any previous subscription agreements then at 645 the UICC processor 106 can attempt a bootstrap registration via a bootstrap subscription agreement in an effort to establish services for the device 102. In one embodiment, the bootstrap registration can include the network enabling the UICC processor to communicate with a network server without providing any user services to the device 102.

If back at 610 the UICC processor 106 determines that the limited service timer has not expired then at 650 and 655 the UICC processor can attempt to register utilizing another subscription agreement that satisfies the selection rules for the particular location (e.g., another subscription agreement that is designated for use with a particular MCC/MNC).

Figure 7:
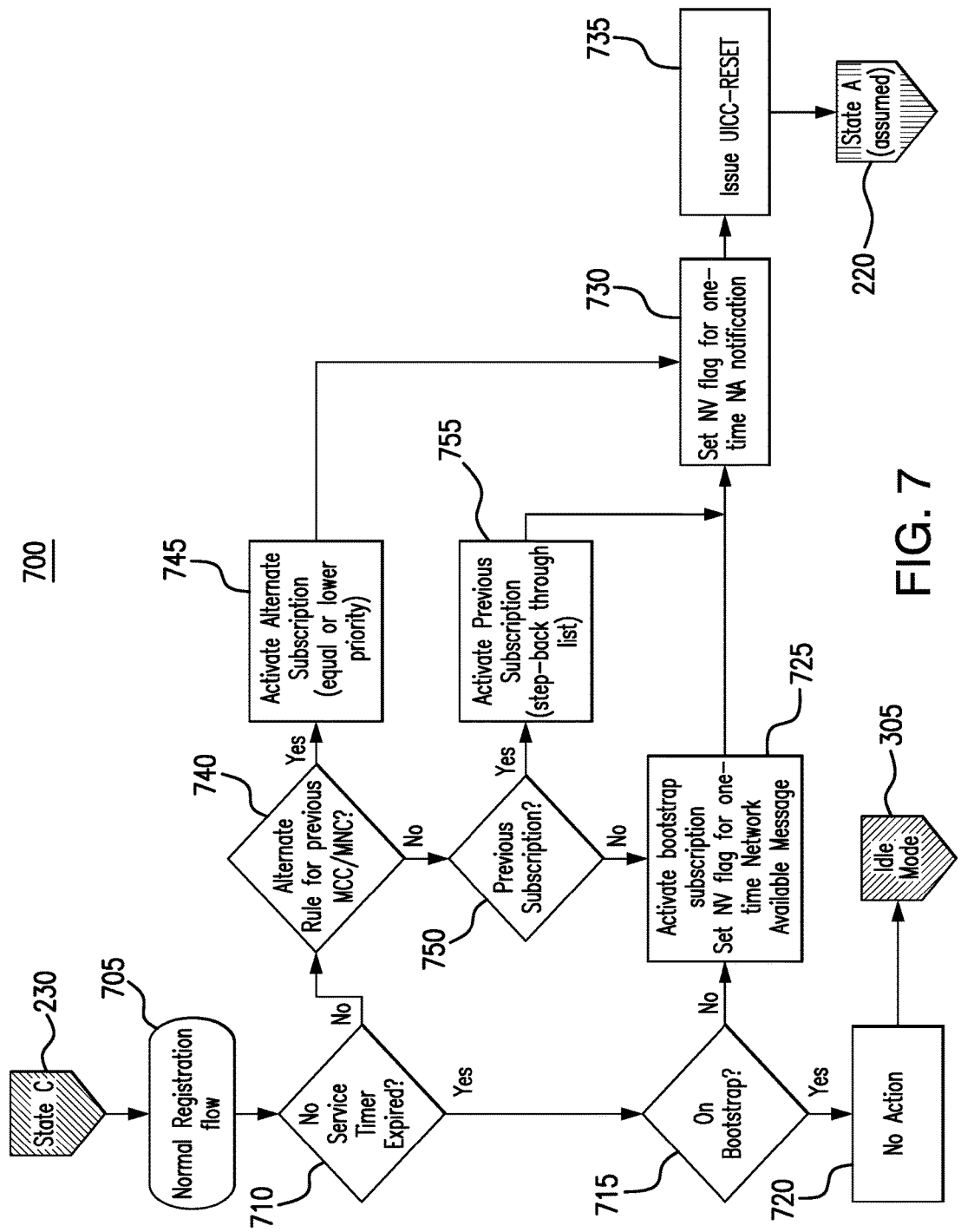

Referring to method 700 of FIG. 7, the device 102 previously determined to be in a no service state 230 can at 705 perform a normal registration flow that includes confirming at 710 whether a time period associated the no service state 230 has expired. If the time period has expired then at 715 the UICC processor 106 can determine whether the device 102 is implementing a bootstrap subscription agreement attempting communications with the network. If the bootstrap subscription agreement is being utilized then no further action is taken at 720 and the device 102 returns to the idle mode 305.

If the bootstrap limited service does not exist then at 725 the UICC processor 106 can attempt a bootstrap registration via a bootstrap subscription agreement in an effort to establish services for the device 102 at 730 and 735. In one embodiment, the bootstrap registration can include the network enabling the UICC processor to communicate with a network server without providing any user services to the device 102.

If back at 710 the UICC processor 106 determines that the no service timer has not expired then at 740 and 745 the UICC processor can attempt to register utilizing another subscription agreement that satisfies the selection rules for the particular location (e.g., another subscription agreement that is designated for use with a particular MCC/MNC).

If on the other hand it is determined that there is no other subscription agreement that satisfies the selection rules for the particular location then the UICC processor 106 can determine at 750 if there was a previous subscription agreement utilized (e.g., a most recently utilized subscription agreement such as for the current location). In the absence of a previous subscription agreement method 700 can employ the bootstrap registration at 725. Otherwise, if there was one or more previous subscription agreements utilized then at 755 the UICC processor 106 can go through each such subscription agreement (e.g., starting from the most recently utilized) until a successful registration occurs via 730 and 735 and the device 102 is returned to a normal service state 220.

Figure 8:
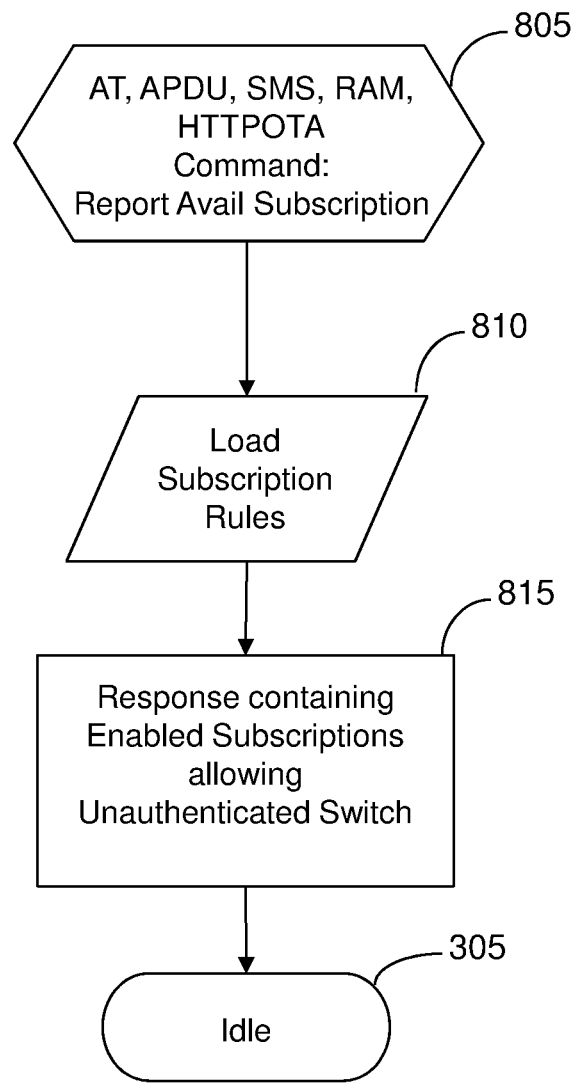

Referring to method 800 of FIG. 8, the device 102 at 805 can receive a request for available subscription agreements (e.g. via a wireless or wired signal) and can load the subscription rules or selection policy at 810. The UICC processor 106 can then generate a response at 815 to the request that indicates one or more enabled subscription agreements that allow switches, such as unauthenticated and return to idle mode 305.

Figure 9:
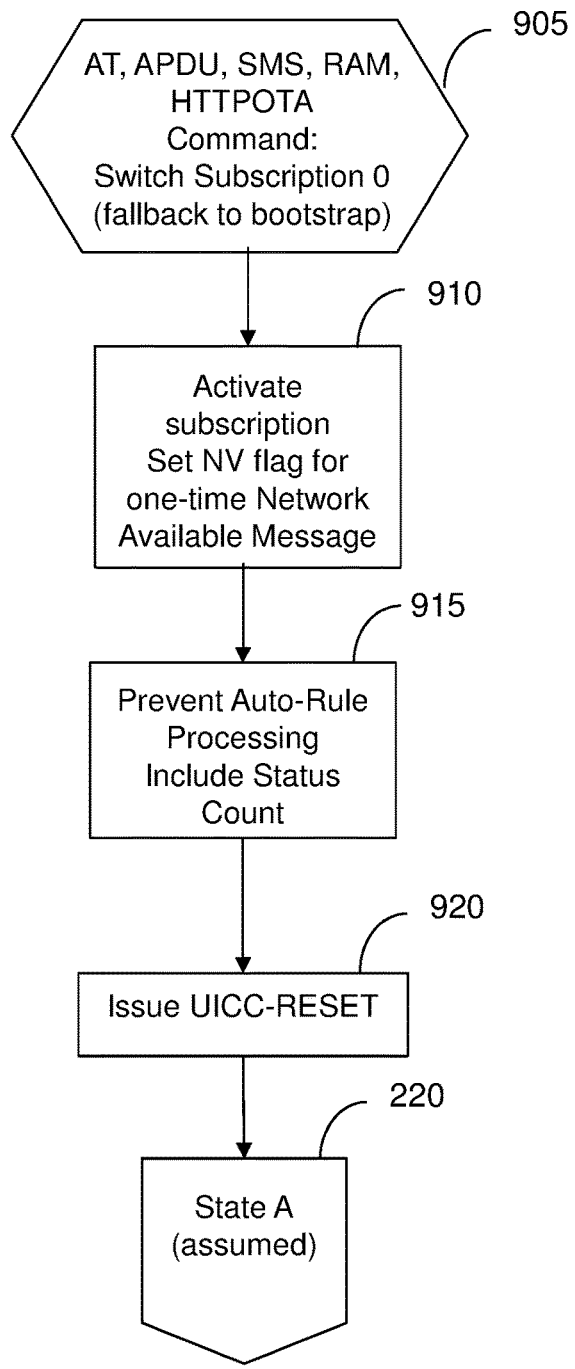

Referring to method 900 of FIG. 9, the device 102 at 905 can receive a request or command to switch from a particular subscription agreement to a target subscription agreement. At 910, the UICC processor 106 can cause the device processor 104 to inform the network that the target subscription agreement is active and at 915 can prevent application of the selection policy that may switch away from the target subscription agreement. The UICC processor 106 can at 920 notify the device processor 104 if a registration of the target subscription agreement is successful and return to the normal service state 220.

Figure 10:
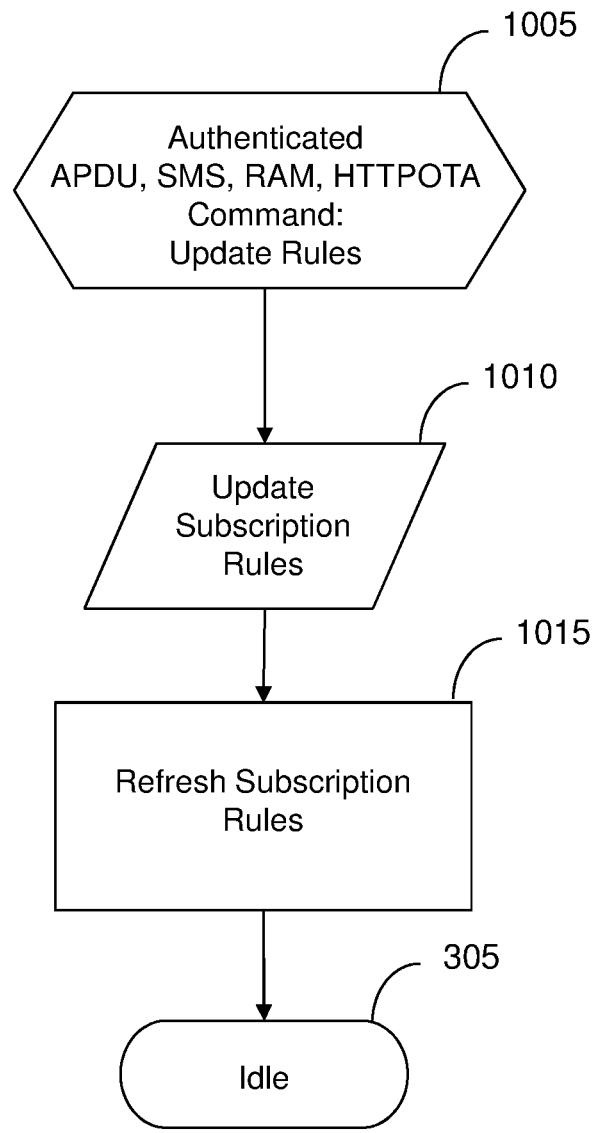

Referring to method 1000 of FIG. 10, the device 102 at 1005 can receive a request or command to adjust the subscription process according to adjustment information. At 1010 and 1015, stored selection rules, criteria or policy can be adjusted based on the received information. For example, the adjustment information can indicate newly enacted government regulations or recently entered into provider partnership agreements that are to be considered when the UICC processor 106 performs the subscription agreement selection process. The UICC processor 106 can then return to the idle mode 305.

Figure 11:
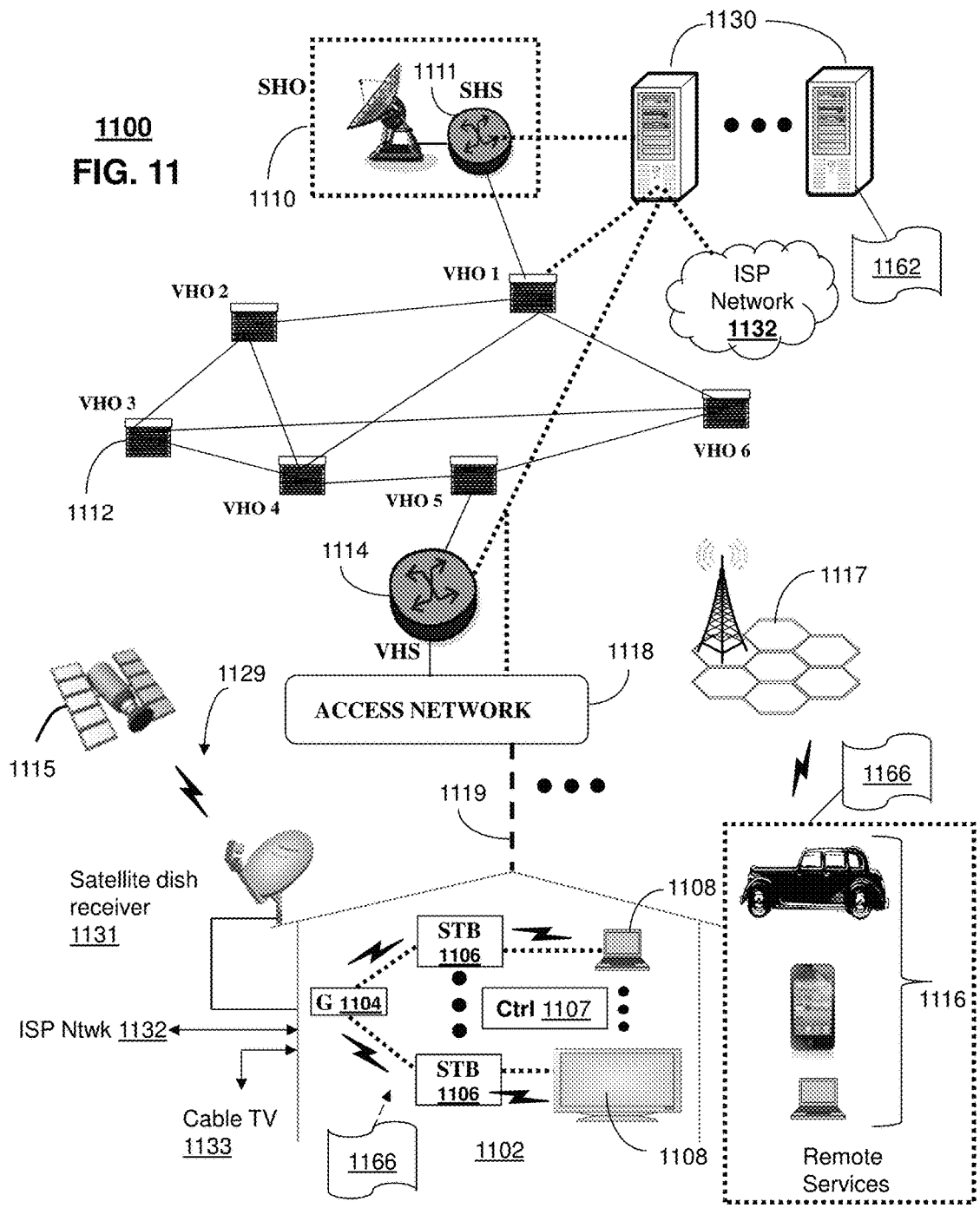
FIG. 11 depicts an illustrative embodiment of a communication system that provides services including selecting a target subscription agreement for those services.

FIG. 11 depicts an illustrative embodiment of a communication system 1100 for providing communication services, including voice, video, data and/or messaging. The communication system 1100 can represent an Interactive television system including an Internet Protocol Television (IPTV) media system. Communication system 1100 can be overlaid or operably coupled with system 100 of FIG. 1 as another representative embodiment of communication system 1100. For instance, one or more devices illustrated in the communication system 1100 of FIG. 11 can select a target subscription agreement from among a group of subscription agreements associated with the device. The selection can be based on various factors including location information, a history of subscription agreements utilized at a location, costs, service types, and so forth.

For example, a communication device of system 1100 can include a UICC processor that obtains subscription utilization information and location information, where the subscription utilization information indicates usage by the communication device of a group of subscription agreements, and where the location information indicates a location of the communication device. In this example, the UICC processor can select a target subscription agreement from among the group of subscription agreements according to the subscription utilization information and the location of the communication device, where the selecting of the target subscription agreement comprises applying selection criteria stored at the communication device, and where a device processor of the communication device does not have access to the selection criteria. In one embodiment, the communication device can then transmit a registration request to a network server according to target registration information stored at the communication device corresponding to the selected target subscription agreement.

The IPTV media system can include a super head-end office (SHO) 1110 with at least one super headend office server (SHS) 1111 which receives media content from satellite and/or terrestrial communication systems. In the present context, media content can represent, for example, audio content, moving image content such as 2D or 3D videos, video games, virtual reality content, still image content, and combinations thereof. The SHS server 1111 can forward packets associated with the media content to one or more video head-end servers (VHS) 1114 via a network of video head-end offices (VHO) 1112 according to a multicast communication protocol.

The VHS 1114 can distribute multimedia broadcast content via an access network 1118 to commercial and/or residential buildings 1102 housing a gateway 1104 (such as a residential or commercial gateway). The access network 1118 can represent a group of digital subscriber line access multiplexers (DSLAMs) located in a central office or a service area interface that provide broadband services over fiber optical links or copper twisted pairs 1119 to buildings 1102. The gateway 1104 can use communication technology to distribute broadcast signals to media processors 1106 such as Set-Top Boxes (STBs) which in turn present broadcast channels to media devices 1108 such as computers or television sets managed in some instances by a media controller 1107 (such as an infrared or RF remote controller).

The gateway 1104, the media processors 1106, and media devices 1108 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1106 and subsystems of the IPTV media system for services such as video-on-demand (VoD), browsing an electronic programming guide (EPG), or other infrastructure services.

A satellite broadcast television system 1129 can be used in the media system of FIG. 11. The satellite broadcast television system can be overlaid, operably coupled with, or replace the IPTV system as another representative embodiment of communication system 1100. In this embodiment, signals transmitted by a satellite 1115 that include media content can be received by a satellite dish receiver 1131 coupled to the building 1102. Modulated signals received by the satellite dish receiver 1131 can be transferred to the media processors 1106 for demodulating, decoding, encoding, and/or distributing broadcast channels to the media devices 1108. The media processors 1106 can be equipped with a broadband port to an Internet Service Provider (ISP) network 1132 to enable interactive services such as VoD and EPG as described above.

In yet another embodiment, an analog or digital cable broadcast distribution system such as cable TV system 1133 can be overlaid, operably coupled with, or replace the IPTV system and/or the satellite TV system as another representative embodiment of communication system 1100. In this embodiment, the cable TV system 1133 can also provide Internet, telephony, and interactive media services. System 1100 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1130, a portion of which can operate as a web server for providing web portal services over the ISP network 1132 to wireline media devices 1108 or wireless communication devices 1116.

Communication system 1100 can also provide for all or a portion of the computing devices 1130 to function as a registration server (herein referred to as server 1130). The server 1130 can use computing and communication technology to perform function 1162, which can include among other things, enabling registration by a communication device for services according to a target subscription agreement selected by the communication device from among a group of subscription agreements associated with the communication device. The media processors 1106 and wireless communication devices 1116 can be provisioned with software functions 1166 to utilize the services of server 1130. For instance, function 1166 of media processors 1106 and wireless communication devices 1116 can be similar to the functions described for device 102 of FIG. 1 in accordance with methods 200-1000. As an example, function 1166 can include one or more of monitoring usage by the communication device of a group of subscription agreements to generate subscription utilization information; selecting a target subscription agreement from among the group of subscription agreements according to the subscription utilization information and location information indicating a location of the communication device where the selecting of the target subscription agreement comprises applying a selection policy stored at the communication device and where a device processor of the communication device does not have access to the selection policy; transmitting a registration request to a network server according to target registration information stored at the communication device corresponding to the target subscription agreement; storing registration information associated with the group of subscription agreements; selecting the target registration information from the registration information; providing a location request to the device processor; obtaining the location information from the device processor responsive to the location request; determining whether limited service is available at the location where the limited service is based on a network server recognizing a second subscription agreement of the group of subscription agreements and denying service for that second subscription agreement and where the target subscription agreement is different from the second subscription agreement; determining that no service is available at the location where the selecting of the target subscription agreement from among the group of subscription agreements is based on determining from the subscription utilization information that the target subscription agreement is a most recently utilized subscription agreement for services at the location, and where the transmitting of the registration request is part of a bootstrap registration communication exchange with the network server. In one embodiment, the selecting of the target subscription agreement is based on determining from the subscription utilization information that the target subscription agreement is a most recently utilized subscription agreement for services at the location. In one embodiment, the selection policy comprises selection criteria including a user cost, a service provider cost, a government regulation, or any combination thereof.

Multiple forms of media services can be offered to media devices over landline technologies such as those described above. Additionally, media services can be offered to media devices by way of a wireless access base station 1117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. In one or more embodiments, the network can include an IP Multimedia Subsystem (IMS) network architecture to facilitate the combined services of circuit-switched and packet-switched systems.

Figure 12:
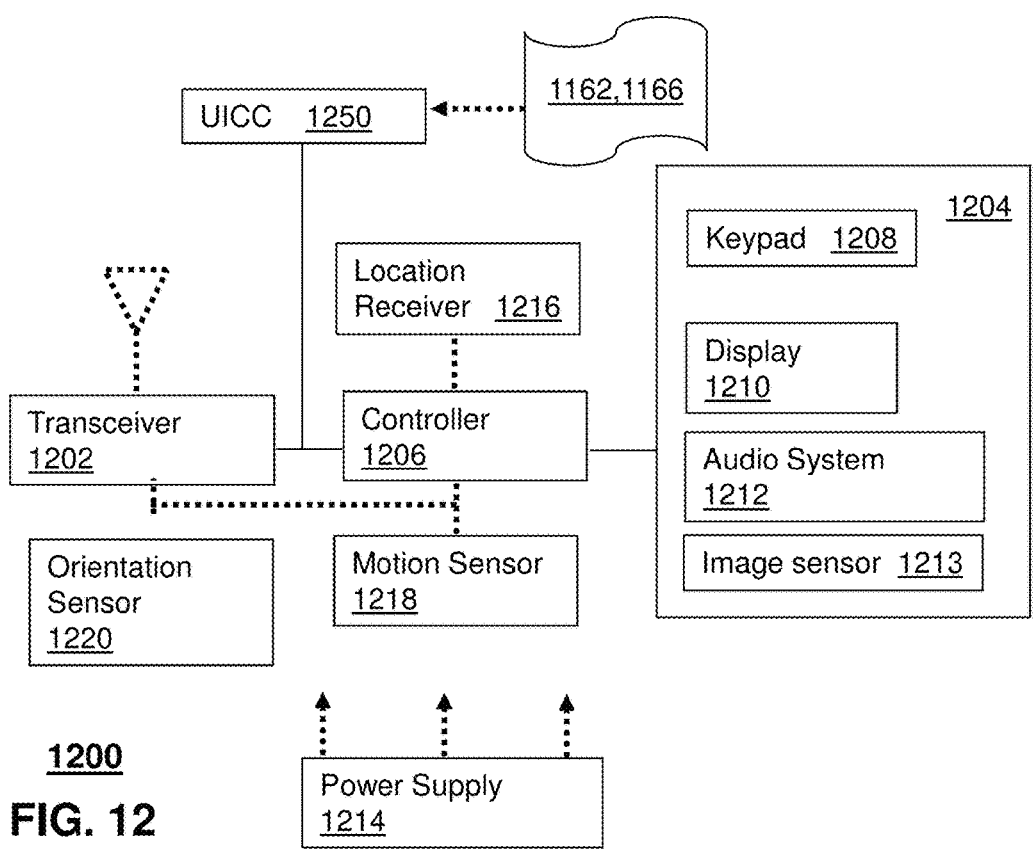
FIG. 12 depicts an illustrative embodiment of a communication device that can be used in enable providing services via multiple subscription agreements.

FIG. 12 depicts an illustrative embodiment of a communication device 1200. Communication device 1200 can serve in whole or in part as an illustrative embodiment of the devices depicted in FIGS. 1 and/or 11 and can be configured to perform portions of methods 200-1000 of FIGS. 2-10. Communication device 1200 can be various types of devices including network devices, vehicle communication systems, Internet of Things (IoT) devices, cargo containers, smart appliances, utility meters, sensor devices, mobile phones, tablets, or communication devices that are capable of utilizing more than one subscription agreement to provide communication services, such as voice, video, data and/or messaging. Communication device 1200 can include a UICC 1250 which has a UICC processor that is distinct from a device controller 1206. The UICC processor can perform various functions (e.g., functions 1162 and 1166) including one or more of storing subscription utilization information in a memory where the subscription utilization information is indicative of a history of subscription usage by the device and where registration information associated with a group of subscription agreements is stored in the memory; receiving location information from the device processor where the location information indicates a location of the device; selecting a target subscription agreement from among the group of subscription agreements according to the history of subscription usage and the location information; and/or initiating a registration with a network server according to target registration information of the registration information corresponding to the target subscription agreement.

Communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device

1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card which may or may not be the UICC 1250. SIM cards can be used for identifying subscriber services, executing programs, storing subscriber data, and so forth.

The communication device 1200 as described herein can operate with more or less of the circuit components shown in FIG. 12. These variant embodiments can be used in one or more embodiments of the subject disclosure.

The communication device 1200 can be adapted to perform the functions of devices of FIGS. 1 and/or 11. It will be appreciated that the communication device 1200 can also represent other devices that can operate in systems 100 and 1100 of FIGS. 1 and/or 11.

Upon reviewing the aforementioned embodiments, it would be evident to an artisan with ordinary skill in the art that said embodiments can be modified, reduced, or enhanced without departing from the scope of the claims described below. For example, the UICC processor can utilize user input and/or user preferences as a criteria for selecting a subscription agreement. In one embodiment, performance metrics can be monitored for the services and utilized as a selection criteria. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router). Further, a connection and/or coupling of components can include direct connection or indirect connection, and can be selective such as being switchable.

Figure 13:
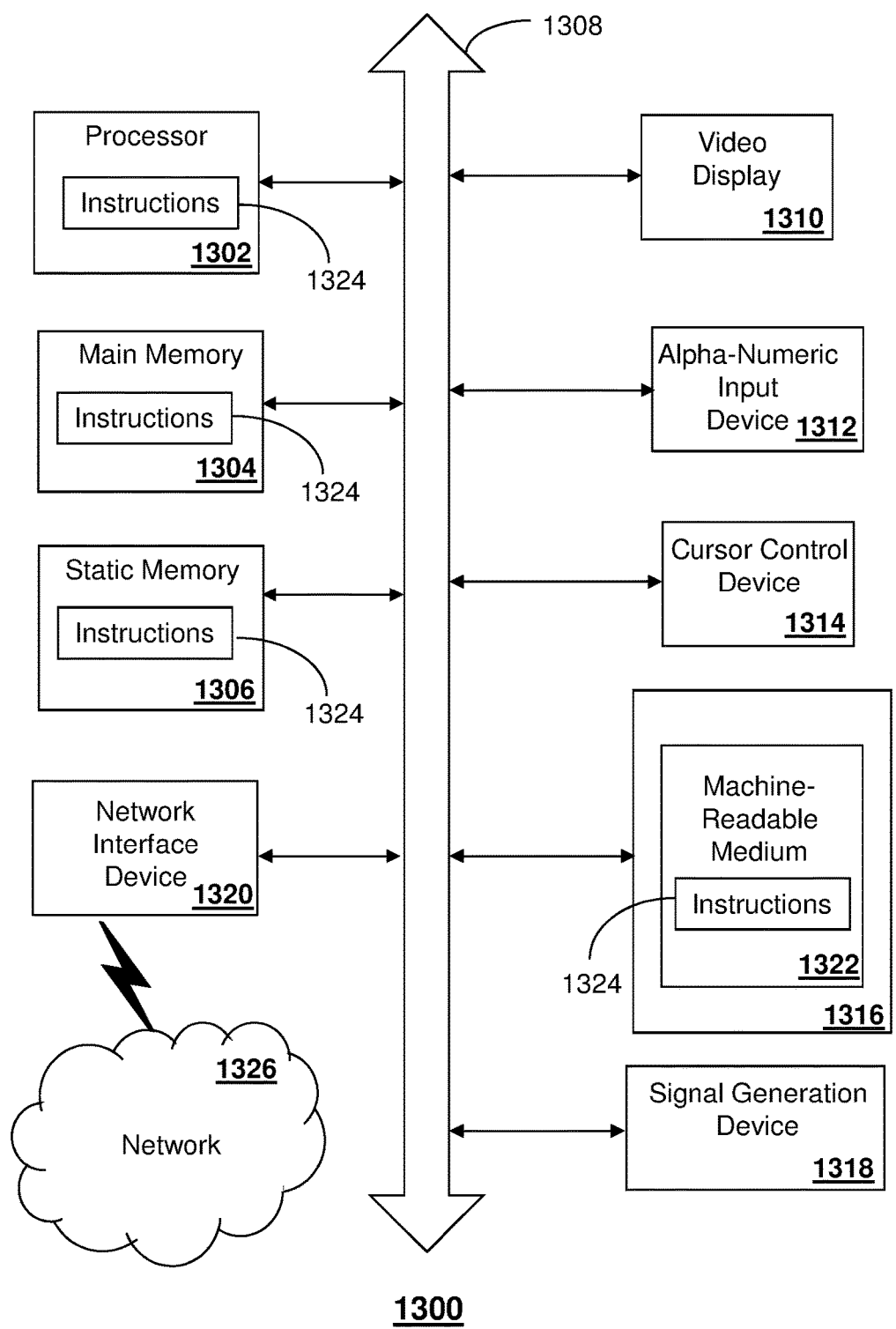
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above. One or more instances of the machine can operate, for example, as the UICC processor 106 in order to enable selection of a subscription agreement based on various criteria such as a current location, a history of subscription utilization, government regulations, provider partnership agreements, costs, and so forth. In some embodiments, the machine may be connected (e.g., using a network 1326) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU)), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processing system including a processor of a Universal Integrated Circuit Card (UICC) at a communication device, facilitate performance of operations, comprising:
    monitoring usage, by the communication device, of services provided under a group of subscription agreements to generate subscription utilization information;
    selecting a target subscription agreement from among the group of subscription agreements according to the subscription utilization information;
    determining whether a limited service level or a normal service level is available at a location, wherein the limited service level is based on a network server recognizing and denying service for a second subscription agreement of the group of subscription agreements, and wherein the normal service level is based on the network server recognizing and providing service for the second subscription agreement of the group of subscription agreements; and
    responsive to the normal service level being available at the location, transmitting a registration request to the network server according to target registration information associated with the target subscription agreement that is stored at the communication device.

2. The non-transitory machine-readable storage medium of claim 1, wherein the operations further comprise storing the subscription utilization information at the communication device.

3. The non-transitory machine-readable storage medium of claim 2, wherein the operations further comprise storing registration information associated with the group of subscription agreements.

4. The non-transitory machine-readable storage medium of claim 1, wherein the target subscription agreement is further selected from among the group of subscription agreements according to comparison of the target subscription and a usage policy.

5. The non-transitory machine-readable storage medium of claim 1, wherein a portion of the group of subscription agreements are with different service providers.

6. The non-transitory machine-readable storage medium of claim 1, wherein the operations further comprise providing a location request to the communication device, wherein location information is received from the communication device in response to the location request.

7. The non-transitory machine-readable storage medium of claim 6, wherein the target subscription agreement is further selected according to determining that the target subscription agreement is a most recently utilized subscription agreement for services according to the location information.

8. The non-transitory machine-readable storage medium of claim 1, wherein the target subscription agreement is further selected according to a selection policy.

9. The non-transitory machine-readable storage medium of claim 8, wherein the selection policy includes selection criteria including a user cost, a service provider cost, a government regulation, or any combination thereof.

10. A universal integrated circuit card of a communication device, comprising:
    a processing system including a processor; and
    a memory that stores executable instructions that, when executed by the processing system, facilitate performance of operations, comprising:
        accessing with a selection policy;
        selecting a target subscription agreement from among a group of subscription agreements according to the selection policy;
        determining whether a limited service level or a normal service level is available at a location, wherein the limited service level is based on a network server recognizing and denying service for a second subscription agreement of the group of subscription agreements, and wherein the normal service level is based on the network server recognizing and providing the second subscription agreement of the group of subscription agreements; and
        responsive to the normal service level being available at the location, transmitting a registration request to the network server according to target registration information associated with the target subscription agreement that is stored at the communication device.

11. The universal integrated circuit card of claim 10, wherein the target subscription agreement is further selected from among the group of subscription agreements according to subscription utilization information that is generated by monitoring usage of services provided under the group of subscription agreements.

12. The universal integrated circuit card of claim 11, wherein the operations further comprise determining from the subscription utilization information that the target subscription agreement is a most recently utilized subscription agreement for services at the location.

13. The universal integrated circuit card of claim 10, wherein the operations further comprise storing registration information associated with the group of subscription agreements.

14. The universal integrated circuit card of claim 10, wherein the operations further comprise:
    providing a location request to the communication device; and
    obtaining location information from the communication device responsive to the location request.

15. The universal integrated circuit card of claim 10, wherein the selection policy includes selection criteria including a user cost, a service provider cost, a government regulation, or any combination thereof.

16. The universal integrated circuit card of claim 10, wherein the operations further comprise determining that no service is available at the location.

17. The universal integrated circuit card of claim 10, wherein the selecting of the target subscription agreement from among the group of subscription agreements is further according to determining from subscription utilization information that the target subscription agreement is a most recently utilized subscription agreement for services at the location.

18. A method, comprising:
    selecting, by a processing system including a processor of a Universal Integrated Circuit Card (UICC) at a communication device, a target subscription agreement from among a group of subscription agreements according to subscription utilization information;
    determining, by the processing system, whether a limited service level or a normal service level is available at a location, wherein the limited service level is based on a network server recognizing and denying service for a second subscription agreement of the group of subscription agreements, and wherein the normal service level is based on the network server recognizing and providing service of the second subscription agreement of the group of subscription agreements; and
    responsive to the normal service being determined to be available at the location, transmitting, by the processing system, a registration request to the network server according to target registration information associated with the target subscription agreement that is stored at the communication device.

19. The method of claim 18, further comprising monitoring, by the processing system, usage, by the communication device, of services provided under the group of subscription agreements to generate the subscription utilization information.

20. The method of claim 18, further comprising:
    providing, by the processing system, a location request to the communication device; and
    obtaining, by the processing system, location information from the communication device responsive to the location request.

* * * * *